(12) United States Patent
Na et al.

(10) Patent No.: US 11,591,666 B2
(45) Date of Patent: Feb. 28, 2023

(54) HOT ROLLED COATED STEEL SHEET HAVING HIGH STRENGTH, HIGH FORMABILITY, EXCELLENT BAKE HARDENABILITY AND METHOD OF MANUFACTURING SAME

(71) Applicant: POSCO, Pohang-si (KR)

(72) Inventors: Hyun-Taek Na, Gwangyang-si (KR); Sung-Il Kim, Gwangyang-si (KR)

(73) Assignee: POSCO CO., LTD, Pohang-si (KR)

(*) Notice: Subject to any disclaimer, the term of this patent is extended or adjusted under 35 U.S.C. 154(b) by 57 days.

(21) Appl. No.: 17/253,284

(22) PCT Filed: Jul. 8, 2019

(86) PCT No.: PCT/KR2019/008378
§ 371 (c)(1),
(2) Date: Dec. 17, 2020

(87) PCT Pub. No.: WO2020/013550
PCT Pub. Date: Jan. 16, 2020

(65) Prior Publication Data
US 2021/0164070 A1 Jun. 3, 2021

(30) Foreign Application Priority Data
Jul. 12, 2018 (KR) .................. 10-2018-0081086

(51) Int. Cl.
*C21D 9/46* (2006.01)
*C21D 8/02* (2006.01)
*C21D 6/00* (2006.01)
*C22C 38/58* (2006.01)
*C22C 38/50* (2006.01)
*C22C 38/48* (2006.01)
*C22C 38/06* (2006.01)
*C22C 38/02* (2006.01)
*C22C 38/00* (2006.01)
*C23C 2/06* (2006.01)
*C23C 2/28* (2006.01)
*C23C 2/40* (2006.01)
*B32B 15/01* (2006.01)

(52) U.S. Cl.
CPC .............. *C21D 9/46* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/48* (2013.01); *C22C 38/50* (2013.01); *C22C 38/58* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ..... B32B 15/013; C23C 28/02; C23C 28/023; C23C 28/025; C23C 2/02; C23C 2/06; C23C 2/12; C23C 2/26; C23C 2/28; C23C 2/40; C23C 30/00; C21D 1/20; C21D 1/84; C21D 2211/001; C21D 2211/002; C21D 2211/005; C21D 2211/008; C21D 6/002; C21D 6/005; C21D 6/008; C21D 8/0205; C21D 8/0226; C21D 8/0242; C21D 8/0263; C21D 9/46; C22C 38/001; C22C 38/002; C22C 38/02; C22C 38/04; C22C 38/06; C22C 38/26; C22C 38/28; C22C 38/38; C22C 38/48; C22C 38/50; C22C 38/58
See application file for complete search history.

(56) References Cited

U.S. PATENT DOCUMENTS

2010/0319819 A1 12/2010 Kaneko et al.
2014/0230970 A1 8/2014 Perlade et al.
(Continued)

FOREIGN PATENT DOCUMENTS

CA      2682342 A1 * 10/2008 ........... B32B 15/013
CN    103534365 A      1/2014
(Continued)

OTHER PUBLICATIONS

Japanese Office Action dated Jan. 25, 2022 issued in Japanese Patent Application No. 2020-571423.
International Search Report dated Oct. 11, 2019 issued in International Patent Application No. PCT/KR2019/008378 (with English translation).
(Continued)

*Primary Examiner* — Anthony M Liang
(74) *Attorney, Agent, or Firm* — Morgan, Lewis & Bockius LLP

(57) ABSTRACT

A hot-rolled coated steel sheet including: in wt %, C: 0.05-0.14%, Si: 0.1-1.0%, Mn: 1.0-2.0%, P: 0.001-0.05%, S: 0.001-0.01%, Al: 0.01-0.1%, Cr: 0.005-1.0%, Ti: 0.005-0.13%, Nb: 0.005-0.03%, N: 0.001-0.01%, Fe residues, and other inevitable impurities; a mixed structure of ferrite and bainite as a main phase; and as a remaining structure, one or more selected from the group consisting of martensite, austenite, and phase martensite (MA), wherein a fraction of the ferrite and bainite is 95-99 area % and Equation 1 is satisfied. [Equation 1] $FCO_{\{110\}<112>}+FCO_{\{112\}<111>} \geq 10$ where, $FCO_{\{110\}<112>}$ and $FCO_{\{112\}<111>}$, each representing an area fraction occupied by a structure having ac crystal orientation of $\{110\}<112>$ and $\{112\}<111>$.

4 Claims, 2 Drawing Sheets

(56) References Cited

U.S. PATENT DOCUMENTS

| | | |
|---|---|---|
| 2014/0234660 A1 | 8/2014 | Kawata et al. |
| 2015/0004433 A1 | 1/2015 | Tanaka et al. |
| 2015/0140358 A1 | 5/2015 | Yokoyama et al. |
| 2015/0329950 A1 | 11/2015 | Azuma et al. |
| 2017/0044638 A1 | 2/2017 | Kokoi et al. |
| 2020/0080167 A1 | 3/2020 | Kim et al. |

FOREIGN PATENT DOCUMENTS

| | | | |
|---|---|---|---|
| CN | 103842541 A | 6/2014 | |
| CN | 104114731 A | 10/2014 | |
| CN | 104968822 A | 10/2015 | |
| EP | 1028167 A2 | 8/2000 | |
| EP | 2762582 A1 | 8/2014 | |
| JP | 2001-226744 A | 8/2001 | |
| JP | 2003-049243 A | 2/2003 | |
| JP | 2008-106350 A | 5/2008 | |
| JP | 2009-263718 A | 11/2009 | |
| JP | 2011-241456 A | 12/2011 | |
| JP | 5391801 B2 | 1/2014 | |
| JP | 2015-214718 A | 12/2015 | |
| KR | 10-0511727 B1 | 8/2005 | |
| KR | 10-0691515 B1 | 3/2007 | |
| KR | 10-1203018 B1 | 11/2012 | |
| KR | 10-2015-0000897 A | 1/2015 | |
| KR | 2015051839 A * | 5/2015 | ............... B21B 3/00 |
| KR | 10-1543860 B1 | 8/2015 | |
| KR | 10-2016-0073494 A | 6/2016 | |
| KR | 10-2016-0078570 A | 7/2016 | |
| KR | 10-1657797 B1 | 9/2016 | |
| KR | 10-1676137 B1 | 11/2016 | |
| KR | 10-2016-0146882 A | 12/2016 | |
| NO | 2016/135893 A1 | 9/2016 | |
| WO | 2018/110853 A1 | 6/2018 | |

OTHER PUBLICATIONS

Extended European Search Report dated Jul. 12, 2021 issued in European Patent Application No. 19833487.2.

Chinese Office Action dated Aug. 20, 2021 issued in Chinese Patent Application No. 201980040323.4.

* cited by examiner

HOT ROLLED COATED STEEL SHEET HAVING HIGH STRENGTH, HIGH FORMABILITY, EXCELLENT BAKE HARDENABILITY AND METHOD OF MANUFACTURING SAME

CROSS-REFERENCE OF RELATED APPLICATIONS

This application is the U.S. National Phase under 35 U.S.C. § 371 of International Patent Application No. PCT/KR2019/008378, filed on Jul. 8, 2019, which in turn claims the benefit of Korean Application No. 10-2018-0081086, filed on Jul. 12, 2018, the entire disclosures of which applications are incorporated by reference herein.

TECHNICAL FIELD

The present invention relates to a hot-rolled coated steel sheet having high strength, high formability, and excellent bake hardenability, and a method of manufacturing the same, and more particularly, to a hot-rolled coated steel sheet that can be preferably applied to brackets, reinforcing materials, connecting materials, and the like, of automobile chassis parts, and a method of manufacturing the same.

BACKGROUND ART

In recent years, as a part of thinning to reduce automobile fuel economy, high strength/thinning of chassis parts have been performed. Due to such thinning, there is an increasing trend in Europe and the Americas to apply hot-rolled coated steel sheets with improved rust prevention properties to chassis parts normally located inside vehicles. In general, as a hot-rolled steel sheet for automobile chassis parts, steel in which fine precipitates are formed in a ferrite matrix structure to improve stretch-flangeability has recently been developed (Patent Document 1), but by utilizing a large amount of precipitates to obtain high strength, it may be difficult to obtain high bake hardenability (BH) because the content of solid solution C and N decreases.

Accordingly, a technology for a steel sheet capable of securing a bake hardenability value by forming a low-temperature transformation structure phase by optimizing not only a precipitation strengthening effect but also cooling conditions was developed (Patent Document 2). However, Patent Document 2 includes an operation of deforming the steel sheet before secondary cooling after rolling—primary cooling—air cooling, so that it is inevitable to introduce additional facilities such as a temper rolling mill in a ROT section when applied at an actual site, and there is a problem in that productivity may be lowered due to inferior distribution properties due to the deformation operation. In addition, before hot-dip zinc plating after hot rolling, a hard phase and a dislocation annealing phenomenon are accompanied in an heating process in a range of 450 to 480° C., such that it may be difficult to secure a sufficient fraction of a Shear Texture in a structure.

Meanwhile, up to now, the issue of securing high bake hardenability in coated steel sheet products has been mainly limited to cold-rolled products, and can be divided into two sub-product groups. First, in manufacturing steel whose tensile strength is 590 MPa or lower, which is mainly applied to exterior panels of automobiles, temper rolling after plating is applied as an additional technology to improve the bake hardenability (Patent Document 3). However, since the strength of the material is fundamentally very low, and the ferrite fraction in the structure is overwhelmingly high, an effect of increasing dislocation density due to physical deformation of the material is not high, precise control during temper rolling does not have a significant effect on improving bake hardenability. Another product group is a high-strength cold-rolled steel material that is applied to automobile bodies, and the technology related thereto is to secure a low-temperature transformation structure of an appropriate fraction by controlling a cooling pattern after heating to an austenite transformation temperature after plating, such that it is to improve the bake hardenability through additional introduction of dislocation density (Patent Document 4).

However, the prior technologies described above as in Patent Documents 3 and 4, that is, content control technologies in ppm units for solid-solution atoms, are significantly less important in a composite structure-based hot-rolled coated steel sheet, and in addition, in technologies for improving bake hardenability by an additional heat-treatment after plating, there is a need to establish an additional process to be suitable to be applied to a steel sheet having a thickness of 1 to 5 mm, such that there is a disadvantage of lowering economic efficiency.

Prior Art (Patent Document 1) Korean Registered Patent Publication No. 10-1203018

(Patent Document 2) Korean Registered Patent Publication No. 10-1657797

(Patent Document 3) Korean Registered Patent Publication No. 10-1676137

(Patent Document 4) Korean Registered Patent Publication No. 10-0691515

DISCLOSURE

Technical Problem

An aspect of the present disclosure is to provide a hot rolled coated steel sheet having high strength, high formability, and excellent bake hardenability, and a method of manufacturing the same.

Technical Solution

According to an aspect of the present disclosure, a hot rolled coated steel sheet having high strength, high formability, and excellent bake hardenability, the hot rolled coated steel sheet includes, in wt %:

C: 0.05 to 0.14%, Si: 0.1 to 1.0%, Mn: 1.0 to 2.0%, P: 0.001 to 0.05%, S: 0.001 to 0.01%, Al: 0.01 to 0.1%, Cr: 0.005 to 1.0%, Ti: 0.005 to 0.13%, Nb: 0.005 to 0.03%, N: 0.001 to 0.01%, Fe residues, and other inevitable impurities; a mixed structure of ferrite and bainite as a main phase; and as a remaining structure, one or more selected from a group consisting of martensite, austenite, and phase martensite (MA), wherein a fraction of the ferrite and bainite is 95 to 99 area % and Equation 1 is satisfied, $$FCO_{\{110\}<112>} + FCO_{\{112\}<111>} \geq 10 \quad \text{[Equation 1]}$$

where, $FCO_{\{110\}<112>}$ and $FCO_{\{112\}<111>}$, each representing an area fraction occupied by a structure having ac crystal orientation of $\{110\}<112>$ and $\{112\}<111>$.

According to another aspect of the present disclosure, a method of manufacturing a hot rolled coated steel sheet having high strength, high formability, and excellent bake hardenability may be provided, the method comprising operations of:

reheating a steel slab including in wt %, C: 0.05 to 0.14%, Si: 0.1 to 1.0%, Mn: 1.0 to 2.0%, P: 0.001 to 0.05%, S: 0.001 to 0.01%, Al: 0.01 to 0.1%, Cr: 0.005 to 1.0%, Ti: 0.005 to 0.13%, Nb: 0.005 to 0.03%, N: 0.001 to 0.01%, Fe residues, and other inevitable impurities;

hot rolling the reheated steel slab at a temperature of Ar3 or higher to 1000° C. to obtain a hot-rolled steel sheet;

primary cooling the hot-rolled steel sheet to a temperature of 550 to 750° C.;

ultra-slow cooling the primary-cooled hot-rolled steel sheet to satisfy the following Equation 2;

secondary cooling the ultra-slow cooled hot-rolled steel sheet to a temperature of 300 to 500° C. and then winding the same;

charging the wound hot-rolled steel sheet into a heating table of 350 to 550° C. and heating, and then extracting the same;

introducing the heated hot-rolled steel sheet into a hot-dip plating bath of 450 to 550° C. to form a plating layer on a surface of the hot-rolled steel sheet; and temper rolling the hot-rolled steel sheet on which the plating layer is formed, $$|T-T_R| \leq 2(T_R = 241 + 109[C] + 16.9[Mn] + 22.7[Cr] - 11.1[Si] - 5.4[Al] - 0.87\text{Temp} + 0.00068\text{Temp}^2) \quad \text{[Equation 2]}$$

where T is an actual ultra-slow cooling time, $T_R$ is a theoretical ultra-slow cooling time, Temp is an intermediate temperature during ultra-slow cooling, and [C], [Mn], [Cr], [Si], and [Al] mean a content of each alloy element, $$15 \leq (1000 - TH) \times El_{SPM} \leq 250 \quad \text{[Equation 3]}$$

where $T_H$ is an average temperature of a charging temperature of a heating table of the hot-rolled steel sheet before being charged into a hot-dip plating bath and an extraction temperature of the same, and $El_{SPM}$ is a difference in length of the hot-rolled steel sheet before temper rolling and immediately after temper rolling.

Advantageous Effects

According to an aspect of the present disclosure, it is possible to provide a hot-rolled coated steel sheet having tensile strength of 780 MPa or more and an elongation rate of 10% or more and simultaneously having excellent bake hardenability, and a method of manufacturing the same.

BEST MODE FOR INVENTION

Figure 1:
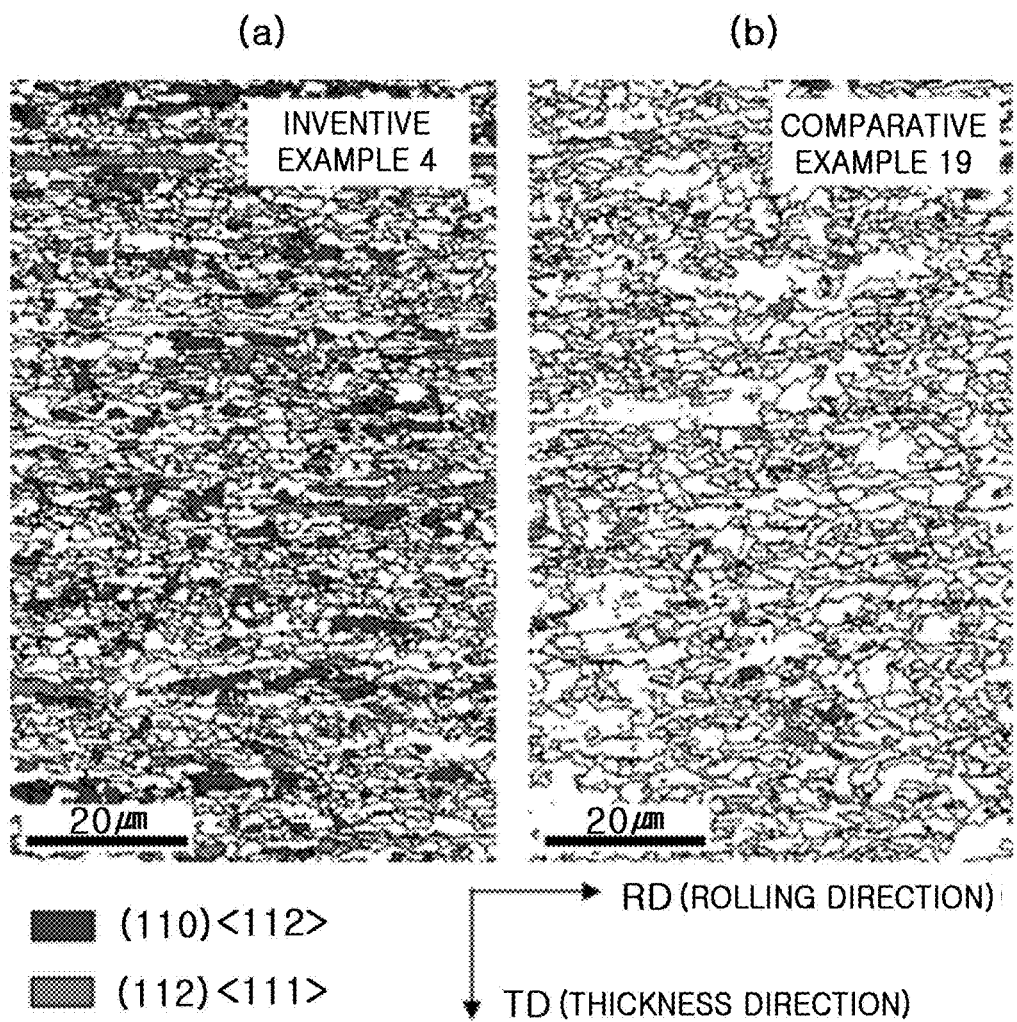
FIG. 1 shows EBSD analysis results of Inventive Example 4 and Comparative Example 19, (a) shows the EBSD analysis results of Inventive Example 4 and (b)shows the EBSD analysis results of Comparative Example 19.

Hereinafter, a hot-rolled coated steel sheet according to an embodiment of the present disclosure will be described.

First, an alloy composition of the hot-rolled coated steel sheet of the present disclosure will be described first. A unit of the alloy composition described below is by weight unless otherwise specified.

Carbon (C): 0.05 to 0.14%

Carbon (C) is the most economical and effective element for reinforcing steel. If an amount thereof increases, a fraction of low-temperature transformation phases such as bainite and martensite increases in composite structure steel, thereby increasing the tensile strength and dislocation density in the structure. If the content of C is lower than 0.05%, it is difficult to easily form a low-temperature transformation phase during cooling after hot rolling, and if the content of C exceeds 0.14%, the strength is excessively increased, and there is a problem in that weldability, formability and toughness are lowered. Therefore, it is preferable that the content of C has a range of 0.05 to 0.14%. A lower limit of the content of C is more preferably 0.06%, and even more preferably 0.065%. An upper limit of the content of C is more preferably 0.13%, even more preferably 0.12%, and most preferably 0.11%.

Silicon (Si): 0.1 to 1.0%

Silicon (Si) deoxidizes molten steel and having a solid solution strengthening effect, and silicon (Si) is a ferrite stabilizing element, and has an effect of promoting ferrite transformation during cooling after hot rolling, and thus silicon (Si) is an effective element for increasing the ferrite fraction constituting a matrix of the composite structure steel. If the content of Si is lower than 0.1%, a ferrite stabilizing effect is small, and thus it is difficult to form the matrix structure into a ferrite structure, such that it is difficult to secure an elongation rate. If the content of Si exceeds 1.0%, ferrite transformation is excessively promoted, and sufficient dislocation may not be secured due to a decrease in the fraction of low-temperature transformation structure in the structure, and a red scale by Si may be formed on a surface of a steel sheet, so that a surface quality of the steel sheet is not only very deteriorated, but also weldability are lowered. Therefore, it is preferable that the content of C has a range of 0.1 to 1.0%. A lower limit of the content of C is more preferably 0.9%, and even more preferably 0.25%. An upper limit of the content of Si is more preferably 0.9%, even more preferably 0.8%, and most preferably 0.7%.

Manganese (Mn): 1.0% to 2.0%

Manganese (Mn) is an effective element for solid solution strengthening of steel together with the Si. Manganese (Mn) increases hardenability of steel to facilitate formation of bainite or martensite during cooling after hot rolling. However, if the content of Mn is lower than 1.0%, the above-described effect may not be sufficiently obtained, and if the content of Mn exceeds 2.0%, it is difficult to secure an appropriate fraction of ferrite by excessively delaying ferrite transformation, and when casing slabs in a casting process, a segregation portion is greatly developed in a thickness central portion, which causes stretch-flangeability to be degraded. Thus, it is preferable that the content of Mn has a range of 1.0 to 2.0%. A lower limit of the content of Mn is more preferably 1.1%, even more preferably 1.2%, and most preferably 1.3%. An upper limit of the content of Mn is more preferably 1.9%, even more preferably 1.8%, and most preferably 1.7%.

Phosphorus (P): 0.001 to 0.05%

Phosphorus (P) is an impurity present in steel, and if the content of P exceeds 0.05%, ductility is reduced by micro-segregation and impact properties of steel are reduced. Meanwhile, in order to control the P to 0.001% or lower, it takes a lot of time during a steelmaking operation, so that productivity is greatly reduced. Therefore, it is preferable that the content of P has a range of 0.001 to 0.05%. The P content is more preferably 0.001 to 0.04%, even more preferably 0.001 to 0.03%, and most preferably 0.001 to 0.02%.

Sulfur (S): 0.001% to 0.01%

Sulfur (S) is an impurity present in steel, and if the content of S exceeds 0.01%, S combines with Mn, or the like to form a non-metallic inclusion, and thus there is a problem that toughness of the steel is greatly reduced. Meanwhile, in order to control the content of S to be lower than 0.001%, a lot of time may be consumed during a steelmaking operation, resulting in a decrease in productivity. Therefore, it is preferable that the content of S has a range of 0.001 to 0.01%.The content of S is more preferably 0.001 to 0.007%, even more preferably 0.001 to 0.005%, and most preferably 0.001 to 0.003%.

Aluminum (Al): 0.01% to 0.9%

Aluminum (Al) is a component mainly added for deoxidation and is preferably included in an amount of 0.01% or more in order to expect a sufficient deoxidation effect. However, when the content of Al exceeds 0.1%, corner cracks are likely to occur in the slab during continuous casting as AlN is formed by bonding with nitrogen, and defects due to formation of inclusions are likely to occur, which are disadvantages. Therefore, it is preferable that the content of Al has a range of 0.01 to 0.1%. A lower limit of the content of Al is more preferably 0.011%, even more preferably 0.013%, and most preferably 0.015%. An upper limit of the content of Al is more preferably 0.08%, even more preferably 0.06%, and most preferably 0.05%.

Chromium (Cr): 0.005% to 1.0%

Chromium (Cr) serves to solid strengthen steel, delays ferrite phase transformation during cooling to facilitate the formation of a low-temperature transformation structure, like Mn. In order to sufficiently obtain the above-described effect, it is preferable that Mn is included in an amount of 0.005% or more. However, if the content of Cr exceeds 1.0%, the ferrite transformation is excessively delayed, so that a fraction of low-temperature transformation structures such as bainite or martensite phases increases more than necessary, and thus an elongation rate is rapidly deteriorated. Therefore, it is preferable that the content of Cr has a range of 0.005 to 1.0%. A lower limit of the content of Cr is more preferably 0.05%, even more preferably 0.1%, and most preferably 0.2%. An upper limit of the Cr content is more preferably 0.9%, even more preferably 0.85%, and most preferably 0.8%.

Titanium (Ti): 0.005 to 0.13%

Titanium (Ti) has a representative precipitation strengthening effect, along with Nb, and forms coarse TiN precipitates in steel with strong affinity with N. The TiN serves to suppress growth of crystal grains during a heating process for hot rolling. Meanwhile, Ti remaining after reacting with N is dissolved in the steel to form TiC precipitates by bonding with C, and the TiC serves to improve the strength of the steel. In order to obtain the above-described effect, it is preferable to include Ti in a content of 0.005% or more. However, if the content of Ti exceeds 0.13%, since TiN or TiC precipitates are excessively formed, the fraction of solid-solution atoms such as C and M among steels required to obtain high bake hardenability may be rapidly reduced. In addition, due to coarsening of the TiN precipitate, stretch-flangeability may decrease. Therefore, it is preferable that the content of Ti have a range of 0.005 to 0.13%. A lower limit of the content of Ti is more preferably 0.01%, even more preferably 0.03%, and most preferably 0.05%. An upper limit of the Ti content is more preferably 0.125%, even more preferably 0.12%, and most preferably 0.115%.

Niobium (Nb): 0.005 to 0.03%

Niobium (Nb) is a representative precipitation strengthening element along with Ti, and serves to improve the strength and impact toughness of steel by miniaturizing crystal grains through retardation of recrystallization by precipitation during hot rolling. In order to sufficiently obtain the above-described effect, it is preferable to include the content of Nb to be 0.005% or higher. However, if the content of Nb exceeds 0.03%, an amount of solid-solution carbon in the steel during hot rolling is rapidly reduced, and elongated crystal grains are formed due to excessive recrystallization delay, resulting in poor stretch-flangeability, which are disadvantages. Therefore, it is preferable that the content of Nb has a range of 0.005 to 0.03%. A lower limit of the Nb content is more preferably 0.007%, even more preferably 0.009%, and most preferably 0.01%. An upper limit of the Nb content is more preferably 0.025%, even more preferably 0.02%, and most preferably 0.018%.

Nitrogen (N): 0.001% to 0.01%

Nitrogen (N) is a representative solution strengthening element together with the C, and forms a coarse precipitate with titanium (Ti), aluminum (Al), and the like. In general, the solid solution strengthening effect of N is better than that of C, but as an amount of N increases in the steel, there is a problem in that the toughness is greatly reduced. Thus, an upper limit of the N is preferably limited to 0.01%. Meanwhile, if the content of N is 0.001% or lower, it takes a lot of time during a steelmaking operation, and thus productivity is deteriorated. Therefore, it is preferable that the content of N has a range of 0.001 to 0.01%. The content of N is more preferably 0.001 to 0.009%, even more preferably 0.001 to 0.008%, and most preferably 0.001 to 0.007%.

A remaining component of the present disclosure is iron (Fe). However, in the general manufacturing process, impurities that are not intended from a raw material or a surrounding environment can be inevitably mixed, and therefore cannot be excluded. Since these impurities can be known to anyone skilled in the ordinary manufacturing process, they are not specifically mentioned in the present specification.

It is preferable that the hot-rolled coated steel sheet provided by the present disclosure includes a mixed structure of ferrite and bainite as a main phase, and includes one or more selected from a group consisting of martensite, austenite, and phase martensite as a remaining structure. The fraction of ferrite and bainite is preferably 95 to 99 area %. One or more selected from the group consisting of martensite, austenite and phase martensite (MA) is preferably 1 to 5 area %. By controlling the fraction of the microstructure as described above, the strength, ductility, yield ratio, stretch-flangeability, and bake hardenability targeted by the present disclosure can be secured. If the fraction of ferrite and bainite is lower than 95 area % or the fraction of the remaining structure exceeds 5 area %, since a fraction of a hard phase is excessively increased, and it is difficult to secure sufficient dislocation density in the microstructure due to an increase in an annealing phenomenon of the hard phases during heating before plating, so the bake hardenability decreases, and not only formability such as ductility and stretch-flangeability is deteriorated, but also weldability is deteriorated, which are problems. On the other hand, when the fractions of ferrite and bainite exceed 99 area % or the fraction of the remaining structure is lower than 1 area %, since it is not possible to secure a sufficient fraction of low-temperature transformation structure in the microstructure, it is difficult to secure sufficient bake hardenability without excessive physical deformation far exceeding an effective $El_{SPM}$ value, presented in Equation 3, which is described below, due to low dislocation density. Here, the low-temperature transformation structure is a hard phase such as bainite, martensite, austenite, and phase martensite (MA).

It is preferable that the fraction of bainite is 3 to 30 area%. When the fraction of bainite is lower than 3% by area, the fraction of ferrite is maximized or the fraction of martensite is increased, so that it is not easy to secure sufficient dislocation density in the structure. On the other hand, if the fraction thereof exceeds 30% by area, the fraction of the hard phase in the structure increases as a whole, resulting in a problem that the ductility and stretch-flangeability are deteriorated. The fraction of bainite is more preferably 5 to 30%, and even more preferably 10 to 30%.

It is preferable that the hot-rolled coated steel sheet of the present disclosure satisfies the following Equation 1. Typically, in a rolled structure, α-fibers having a {110}//RD relationship and γ-fibers having a {111}//ND relationship are mainly observed in the rolled structure, but {110}<112> and {112}<111> crystal orientation is formed when shear deformation occurs in the structure. So the shear deformation may facilitate the generation of dislocations compared to the normal rolled structure, and may be a measure by which an increase in dislocation density in a structure can be measured. The hot-rolled coated steel sheet of the present disclosure can secure excellent strength, ductility and bake hardenability by introducing sufficient dislocation by satisfying the following Equation 1. If the value of the following Equation 1 is not satisfied, a problem in which it is not easy to secure high bake hardenability may occur because shear deformation sufficient to introduce sufficient dislocation density in the structure is not applied. Meanwhile, RD and ND mentioned as described above mean a Rolling Direction (RD) and a Normal Direction (ND), respectively.

$$FCO_{\{110\}<112>}+FCO_{\{112\}<111>} \geq 10 \quad \text{[Equation 1]}$$

where, $FCO_{\{110\}<112>}$ and $FCO_{\{112\}<111>}$ refer to the area fraction of the structures having the {110}<112> and {112}<111> crystal orientations, respectively The hot-rolled coated steel sheet of the present disclosure satisfying the above-described alloy composition, microstructure, and Equation 1 has bake hardenability (BH): 30 MPa or more, tensile strength (TS): 780 MPa or more, an elongation rate (El): 10% or more, a yield ratio (YR): 0.8 or more, and stretch-flangeability: 40% or more, so that excellent mechanical properties can be secured. Meanwhile, the bake hardenability may be in accordance with a Low-BH measurement standard.

Meanwhile, the hot-rolled coated steel sheet provided by the present disclosure may be a steel sheet in which a plating layer including one or more of zinc or aluminum on one side or both sides of a base steel sheet, and the plating layer may include all of those commonly used in the art.

The hot-rolled coated steel sheet of the present disclosure described above may be manufactured by various methods, and the manufacturing method thereof is not particularly limited. However, as a preferred example, it may be manufactured by the following methods.

Hereinafter, a method of manufacturing a hot-rolled coated steel sheet according to an embodiment of the present disclosure will be described.

(Reheating a Steel Slab)

A steel slab having the above-described alloy composition is reheated. A reheating temperature of the steel slab is preferably 1180 to 1300° C.

If the reheating temperature of the steel slab is lower than 1180° C., it becomes difficult to secure the temperature during hot rolling due to insufficient aging heat of the slab, and it becomes difficult to resolve segregation generated during continuous casting through diffusion. In addition, since precipitates deposited during continuous casting may not be sufficiently resolved, it may be difficult to obtain a precipitation strengthening effect in a process after hot rolling. On the other hand, if the reheating temperature of the steel slab exceeds 1300° C., strength reduction and structural unevenness may be promoted by the growth of austenite grains. Therefore, it is preferable that the reheating temperature of the steel slab has a range of 1180 to 1300° C. A lower limit of the reheating temperature of the steel slab is more preferably 1185° C., even more preferably 1190° C., and most preferably 1200° C. An upper limit of the reheating temperature of the steel slab is more preferably 1295° C., even more preferably 1290° C., and most preferably 1280° C.

(Hot Rolling)

The reheated steel slab is hot-rolled at a temperature of Ar3 or higher, which is a ferrite phase transformation starting temperature, to obtain a hot-rolled steel sheet. If the hot-rolling temperature is lower than Ar3, it is difficult to secure the structure and properties targeted by the present disclosure by rolling after ferrite transformation, and if the hot-rolling temperature exceeds 1000° C., there is a problem in that formability is deteriorated due to an increase in scale defects increase on a surface thereof. Therefore, it is preferable that the hot-rolling temperature has a range of Ar3 or higher to 1000° C. A lower limit of the hot-rolling temperature is more preferably 850° C., even more preferably 860° C., and most preferably 870° C. An upper limit of the hot-rolling temperature is more preferably 935° C., even more preferably 930° C., and most preferably 920° C.

(Primary Cooling)

The hot-rolled steel sheet is primarily cooled to a temperature of 550 to 750° C. If the primary cooling stop temperature is lower than 550° C., a microstructure of steel mainly includes a bainite phase, so a ferrite phase cannot be obtained as a matrix structure, so that it is difficult to secure a sufficient elongation rate. On the other hand, if the primary cooling stop temperature exceeds 750° C., coarse ferrite and pearlite structures are formed, and the desired strength cannot be secured. Therefore, it is preferable that the primary cooling stop temperature has a range of 550 to 750° C. A lower limit of the primary cooling stop temperature is more preferably 560° C., even more preferably 580° C., and most preferably 600° C. An upper limit of the primary cooling stop temperature is more preferably 740° C., even more preferably 730° C., and most preferably 720° C.

During the primary cooling, a cooling rate is preferably 20° C./sec or higher. If the primary cooling rate is lower than 20° C./sec, ferrite and pearlite phase transformation occurs during cooling, so that a desired level of hard phase cannot be secured, and desired strength and bake hardenability cannot be secured. Therefore, the primary cooling rate is preferably 20° C./sec or more. The primary cooling rate is more preferably 30° C./sec or more, even more preferably 45° C./sec or more, and most preferably 60° C./sec or more. Meanwhile, in the present disclosure, the higher the primary cooling rate is, the more preferable, so the upper limit of the primary cooling rate is not particularly limited, and may be appropriately selected in consideration of a cooling facility.

(Ultra-Slow Cooling)

The primarily-cooled hot-rolled steel sheet is ultra-slow cooled to satisfy the following Equation 2. The Equation 2 described above is to obtain a microstructure proposed in the present disclosure, and by optimizing an intermediate temperature (Temp) and an ultra-slow cooling time during ultra-slow cooling, an appropriate fraction of solid solution carbon is present after ferrite transformation in a range that can secure strength, ductility, and formability. Thereby, an appropriate fraction of low-temperature transformation structure in steel after cooling is formed, such that it is intended to introduce a sufficient dislocation to an inferior of the low-temperature transformation structure and an interface of ferrite and the low-temperature transformation phase. If the following Equation 2 is not satisfied, it is not possible to secure an appropriate fraction of low-temperature transformation structure in the structure of the hot-rolled steel sheet, and thus it may be difficult to secure sufficient bake hardenability without excessive physical deformation far exceeding the effective $El_{SPM}$ value shown in Equation 3 described below. Therefore, it is preferable that $|T-T_R|$ in the following Equation 2 is 2 or lower. The $|T-T_R|$ is more preferably 1.95 or lower, even more preferably 1.925 or lower, and most preferably 1.9 or lower. Meanwhile, in the following Equation 2, $T_R$ (a theoretical ultra-slow cooling time) is an ultra-slow cooling time to obtain an optimal microstructure fraction targeted in the present disclosure, and Temp (an intermediate temperature during ultra-slow cooling) is an intermediate temperature of an ultra-slow cooling start temperature and end temperature.

$$|T-T_R| \leq 2(T_R=241+109[C]+16.9[Mn]+22.7[Cr]-11.1[Si]-5.4[Al]-0.87\text{Temp}+0.00068\text{Temp}^2)$$ [Equation 2]

where, T is an actual ultra-slow cooling time, $T_R$ is a theoretical ultra-slow cooling time, and Temp is an intermediate temperature during extreme-slow cooling, and [C], [Mn], [Cr], [Si], and [Al] mean a content of each alloy element It is preferable that an ultra-slow cooling rate is 2.0° C./sec or lower during the ultra-slow cooling. If the ultra-slow cooling rate exceeds 2.0° C./sec, there is a disadvantage of causing material deviation because a phase transformation behavior of a lengthwise electric field of the rolled coil is not uniform. Therefore, the ultra-slow cooling rate is preferably 2.0° C./sec or lower. The ultra-slow cooling rate is more preferably 1.9° C./sec or lower, even more preferably 1.75° C./sec or lower, and most preferably 1.5° C./sec or lower.

An ultra-slow cooling maintaining time during the ultra-slow cooling is preferably 10 seconds or lower (excluding 0 seconds). If the ultra-slow cooling maintaining time exceeds 10 seconds, the ferrite fraction becomes also excessively high such that it difficult to secure the desired strength and bake hardenability. Therefore, the ultra-slow cooling maintaining time is preferably 10 seconds or lower. The ultra-slow cooling maintaining time is more preferably 9.7 seconds or lower, even more preferably 9.5 seconds or lower, and most preferably 9 seconds or lower.

An intermediate temperature (Temp) during the ultra-slow cooling is preferably 545 to 745° C. If the intermediate temperature during ultra-slow cooling is lower than 545° C., the microstructure in the steel mainly includes a bainite phase, and thus, a ferrite phase cannot be obtained as a matrix structure, such that it maybe difficult to secure a sufficient elongation rate. On the other hand, if the intermediate temperature exceeds 745° C., coarse ferrite and pearlite structure may be formed, such that desired strength may not be secured. That is, the intermediate temperature (Temp) during the ultra-slow cooling is preferably 545 to 745° C. A lower limit of the intermediate temperature during the ultra-slow cooling is more preferably 550° C., even more preferably 555° C., and most preferably 560° C. An upper limit of the intermediate temperature during the ultra-slow cooling is more preferably 740° C., even more preferably 735° C., and most preferably 730° C.

(Secondary Cooling)

The ultra-slowly cooled hot-rolled steel sheet is wound after secondary cooling to a temperature of 300 to 500° C. If the secondary cooling stop temperature is lower than 300° C., a fraction of hard phases such as martensite, austenite, and phase martensite (MA) is excessively increased, and if the secondary cooling stop temperature exceeds 500° C., a sufficient low-temperature transformation structure fraction including bainite may not be secured, such that it is difficult to secure sufficient bake hardenability without excessive physical deformation far exceeding the effective $El_{SPM}$ value presented in Equation 3 described below. Therefore, it is preferable that the secondary cooling stop temperature has a range of 300 to 500° C. A lower limit of the secondary cooling stop temperature is more preferably 310° C., even more preferably 320° C., and most preferably 330° C. An upper limit of the secondary cooling stop temperature is more preferably 495° C., even more preferably 490° C., and most preferably 485° C.

During the secondary cooling, the cooling rate is preferably 20° C./sec or more. If the secondary cooling rate is lower than 20° C./sec, there is a disadvantage in that it is difficult to secure the strength and bake hardenability suggested by the present disclosure due to an increase in the ferrite fraction. Therefore, the secondary cooling rate is preferably 20° C./sec or higher. The secondary cooling rate is more preferably 30° C./sec or more, even more preferably 40° C./sec or more, and most preferably 50° C./sec or more. Meanwhile, in the present disclosure, the higher the secondary cooling rate is, the most preferable, an upper limit of the secondary cooling rate is not limited, and may be appropriately selected in consideration of a cooling facility.

(Correcting, Picking)

In the present disclosure, after the winding, an operation of pickling the wound hot-rolled steel sheet is further included. The pickling is for removing a scale on a surface of the steel sheet. It is preferable that the pickling is performed at 200° C. or lower. If the pickling temperature exceeds 200° C., there is a disadvantage that surface roughness of the steel sheet is deteriorated due to excessive pickling. In the present disclosure, a lower limit of the pickling temperature is not particularly limited, and for example, the lower limit of the pickling temperature may be room temperature. Meanwhile, the steel sheet may be cooled using natural cooling such as air cooling until the pickling process after the winding. In the present disclosure, before the pickling, an operation of correcting the shape of the wound hot-rolled steel sheet may be further included. After the winding process, waves may occur at an edge portion of the steel sheet. Therefore, in the present disclosure, it is possible to improve the quality and a yield rate of the steel sheet by correcting the shape of waves.

(Heating)

The wound hot-rolled steel sheet is charged to a heating table at 350 to 550° C., heated, and then extracted. Control of the heating temperature control is to improve wettability with a plating solution during a subsequent plating process. If the heating temperature is lower than 350° C., there may be a problem in that sufficient wettability is not secured, so plating properties are deteriorated. If the heating temperature exceeds 550° C., a significant amount of dislocations formed in the steel sheet is lost, and it maybe difficult to secure sufficient bake hardenability even if additional dislocations are introduced by physical deformation to the steel sheet through temper rolling, or the like. Therefore, the heating temperature is preferably 350 to 550° C. A lower limit of the heating temperature is more preferably 360° C., even more preferably 370° C., and most preferably 380° C. An upper limit of the heating temperature is more preferably 540° C., even more preferably 520° C., and most preferably 500° C.

(Plating, Temper Rolling)

The heated hot-rolled steel sheet is introduced into a hot-dip plating bath of 450 to 550° C. to form a plating layer on a surface of the hot-rolled steel sheet. If the plating temperature is lower than 450° C., since sufficient wettability may not be secured, a problem in that plating properties are deteriorated, and an elongation rate may also decrease. On the other hand, if the plating temperature exceeds 550° C., a significant amount of dislocations formed in the steel sheet is lost, and it may be difficult to secure sufficient bake hardenability even if additional dislocations are introduced by physical deformation to the steel sheet through temper rolling, or the like. The hot-dip plating bath may include one or more of zinc or aluminum.

During the plating, it is preferable that an introduction speed of the hot-dip plating bath is 10 to 60 mpm (m/min). If the introduction speed of the hot-dip plating bath of the hot-rolled steel sheet is lower than 10 mpm, there is a disadvantage such as deterioration of surface quality due to overpickling, and if it exceeds 60 mpm, red scale of the surface remains due to micropickling, there maybe a disadvantage such as non-plating. Therefore, it is preferable that the introduction speed of the hot-dip plating bath of the hot-rolled steel sheet is 10 to 60 mpm. A lower limit of the hot-dip plating bath of the hot-rolled steel sheet is more preferably 15 mpm, even more preferably 17 mpm, and most preferably 20 mpm. An upper limit of the introduction speed of the hot-dip plating bath of the hot-rolled steel sheet is more preferably 58 mpm, even more preferably 57 mpm, and most preferably 55 mpm.

Thereafter, temper rolling (SPM) is performed on the hot-rolled steel sheet on which the plating layer is formed. The temper rolling is for introducing additional dislocations to the hot-rolled steel sheet, and thereby, it is possible to improve the bake hardenability.

Meanwhile, in the present disclosure, it is preferable to satisfy the following Equation 3 in the heating operation and temper rolling operation described above.

If $(1000-T_H) \times El_{SPM}$ in the following Equation 3 is lower than 15, there is a disadvantage that sufficient dislocations in the structure cannot be secured due to a high heat treatment temperature or a low SPM elongation rate, so that the level of bake hardening ability presented in the present disclosure cannot be satisfied. If it exceeds 250, there are disadvantages in that plating quality is deteriorated or such as excessive strength and insufficient ductility due to excessive SPM works. Therefore, the $(1000-T_H) \times El_{SPM}$ preferably has a range of 15 to 250. A lower limit of $(1000-T_H) \times El_{SPM}$ is more preferably 16, even more preferably 18, and most preferably 20. An upper limit of $(1-T_H) \times E_{lSPM}$ is more preferably 245, even more preferably 240, and most preferably 230.

$$15 \leq (1000-T_H) \times El_{SPM} \leq 250 \quad \text{[Equation 3]}$$

$T_H$ is an average temperature of a charging temperature of a heating table of a hot-rolled steel sheet before being charged to a hot-dip plating bath and an extraction temperature, and $El_{SPM}$ is the difference in length of the hot-rolled steel sheet before temper rolling and immediately after temper rolling Meanwhile, the $El_{SPM}$ is preferably 0.03 to 0.5%.

If the $El_{SPM}$ is lower than 0.03%, the introduction of additional dislocations is not sufficient, and if $El_{SPM}$ exceeds 0.5%, it may cause deterioration in formability due to a decrease in ductility and an excessive increase in yield strength. Therefore, the $El_{SPM}$ is preferably 0.03 to 0.5%. A lower limit of the $El_{SPM}$ is more preferably 0.04%, even more preferably 0.05%, and most preferably 0.07%. An upper limit of the $El_{SPM}$ is more preferably 0.4%, even more preferably 0.35%, and most preferably 0.3%.

Mode for Invention

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLE

After a steel slab having an alloy composition shown in Table 1 below is prepared, is reheated to 1250° C., and is hot rolled under conditions of Table 2 to obtain a hot-rolled steel sheet having a 3.5 mm thickness, and then primary cooling, ultra-slow cooling, and secondary cooling were performed. In this case, a primary cooling rate was 80° C./sec, and a secondary cooling rate was 70° C./sec. Thereafter, the hot-rolled steel sheet was corrected and pickled, and then plated and temper-rolled under conditions of Table 3 below. After a microstructure and mechanical properties on the hot-rolled steel sheet prepared as described above, was measured, results thereof were shown in Tables 3 and 4 below. In this case, the microstructure was measured by photographing the steel sheet with a SEM of 3000 magnification, and then an area fraction of each phase was calculated using an image analyzer. In particular, the area fraction of a MA phase in the steel was measured using an optical microscope and a SEM at the same time after etching by a LePera etching method. In addition, in order to analyze a crystal orientation in the microstructure, an EBSD analysis for an area from 80 μm to 180 μm in a thickness direction of the steel sheet, and area to 50 μm in a rolling direction thereof, that is, for an area of 100 μm×50 μm was performed based on an interface between a plating layer and a base steel sheet, to measure a fraction of structures having {110}<112> and {112}<111> orientations. In addition, mechanical properties were measured by preparing a DIN standard C-direction specimen for the each hot-rolled steel sheet, and then performing a tensile test at room temperature at a strain rate of 10 mm/min. Bake hardenability (BH) was measured by preparing a DIN standard L-direction standard, performing 2% deformation, and then performing heat-treatment the 2% deformed specimen in an oil bath at 170° C. for 20 minutes and air cooling at room temperature, and then measuring a low-yield value, as a difference value thereof. Stretch-flangeability was evaluated based on JFST 1001 to 1996 standards.

| ST No. | C | Si | Mn | P | S | Cr | Ti | Nb | Al | N |
|---|---|---|---|---|---|---|---|---|---|---|
| ST 1 | 0.05 | 0.3 | 1.6 | 0.01 | 0.003 | 0.6 | 0.09 | 0.014 | 0.04 | 0.003 |
| ST 2 | 0.07 | 0.4 | 1.7 | 0.01 | 0.003 | 0.4 | 0.08 | 0.015 | 0.05 | 0.004 |
| ST 3 | 0.06 | 0.2 | 1.7 | 0.01 | 0.003 | 0.5 | 0.04 | 0.014 | 0.03 | 0.003 |
| ST 4 | 0.06 | 0.3 | 1.2 | 0.01 | 0.003 | 0.8 | 0.11 | 0.015 | 0.03 | 0.004 |
| ST 5 | 0.07 | 0.2 | 1.2 | 0.01 | 0.003 | 0.7 | 0.05 | 0.014 | 0.04 | 0.003 |
| ST 6 | 0.08 | 0.5 | 1.5 | 0.01 | 0.003 | 0.6 | 0.09 | 0.014 | 0.05 | 0.003 |
| ST 7 | 0.09 | 0.7 | 1.7 | 0.01 | 0.003 | 0.7 | 0.04 | 0.015 | 0.05 | 0.003 |
| ST 8 | 0.09 | 0.7 | 1.6 | 0.01 | 0.003 | 0.7 | 0.08 | 0.014 | 0.04 | 0.003 |
| ST 9 | 0.07 | 0.9 | 1.9 | 0.01 | 0.003 | 0.6 | 0.09 | 0.014 | 0.04 | 0.004 |
| ST 10 | 0.11 | 0.9 | 1.4 | 0.01 | 0.003 | 0.8 | 0.11 | 0.015 | 0.03 | 0.004 |
| ST 11 | 0.04 | 0.8 | 1.4 | 0.01 | 0.003 | 0.7 | 0.08 | 0.015 | 0.04 | 0.003 |
| ST 12 | 0.17 | 0.4 | 1.7 | 0.01 | 0.003 | 0.6 | 0.11 | 0.014 | 0.04 | 0.003 |
| ST 13 | 0.08 | 0.01 | 1.5 | 0.01 | 0.003 | 0.7 | 0.12 | 0.014 | 0.05 | 0.004 |
| ST 14 | 0.08 | 1.2 | 1.5 | 0.01 | 0.003 | 0.6 | 0.04 | 0.015 | 0.05 | 0.004 |
| ST 15 | 0.07 | 0.5 | 0.7 | 0.01 | 0.003 | 0.7 | 0.11 | 0.014 | 0.04 | 0.003 |
| ST 16 | 0.08 | 0.2 | 2.9 | 0.01 | 0.003 | 0.4 | 0.04 | 0.014 | 0.04 | 0.004 |
| ST 17 | 0.07 | 0.3 | 1.6 | 0.01 | 0.003 | 0.004 | 0.08 | 0.014 | 0.04 | 0.004 |
| ST 18 | 0.07 | 0.8 | 1.5 | 0.01 | 0.003 | 1.2 | 0.09 | 0.014 | 0.05 | 0.004 |
| ST 19 | 0.07 | 0.5 | 1.7 | 0.01 | 0.003 | 0.6 | 0.07 | 0.014 | 0.03 | 0.003 |
| ST 20 | 0.07 | 0.5 | 1.7 | 0.01 | 0.003 | 0.6 | 0.07 | 0.014 | 0.03 | 0.003 |
| ST 21 | 0.07 | 0.5 | 1.7 | 0.01 | 0.003 | 0.6 | 0.07 | 0.014 | 0.03 | 0.003 |
| ST 22 | 0.07 | 0.5 | 1.7 | 0.01 | 0.003 | 0.6 | 0.07 | 0.014 | 0.03 | 0.003 |
| ST 23 | 0.07 | 0.5 | 1.7 | 0.01 | 0.003 | 0.6 | 0.07 | 0.014 | 0.03 | 0.003 |
| ST 24 | 0.07 | 0.5 | 1.7 | 0.01 | 0.003 | 0.6 | 0.07 | 0.014 | 0.03 | 0.003 |
| ST 25 | 0.07 | 0.5 | 1.7 | 0.01 | 0.003 | 0.6 | 0.07 | 0.014 | 0.03 | 0.003 |
| ST 26 | 0.07 | 0.5 | 1.7 | 0.01 | 0.003 | 0.6 | 0.07 | 0.014 | 0.03 | 0.003 |
| ST 27 | 0.07 | 0.5 | 1.7 | 0.01 | 0.003 | 0.6 | 0.07 | 0.014 | 0.03 | 0.003 |
| ST 28 | 0.07 | 0.5 | 1.7 | 0.01 | 0.003 | 0.6 | 0.07 | 0.014 | 0.03 | 0.003 |
| ST 29 | 0.07 | 0.5 | 1.7 | 0.01 | 0.003 | 0.6 | 0.07 | 0.014 | 0.03 | 0.003 |
| ST 30 | 0.07 | 0.5 | 1.7 | 0.01 | 0.003 | 0.6 | 0.07 | 0.014 | 0.03 | 0.003 |

*ST: Steel Type

| Division | ST No. | Finish rolling temperature (° C.) | Primary cooling end temperature (° C.) | Intermediate temperature during ultra-slow cooling (Temp) (° C.) | Actual ultra-slow cooling time (T) (seconds) | Secondary cooling end temperature (° C.) | Theoretical ultra-slow cooling time ($T_R$) (seconds) | Equation 2 |
|---|---|---|---|---|---|---|---|---|
| IE 1 | ST 1 | 900 | 640 | 635 | 6 | 450 | 5.3 | 0.7 |
| IE 2 | ST 2 | 880 | 600 | 595 | 6 | 470 | 4.8 | 1.2 |
| IE 3 | ST 3 | 880 | 640 | 635 | 8 | 480 | 7.0 | 1.0 |
| IE 4 | ST 4 | 900 | 620 | 615 | 6 | 470 | 4.6 | 1.4 |
| IE 5 | ST 5 | 890 | 640 | 635 | 6 | 480 | 4.1 | 1.9 |
| IE 6 | ST 6 | 860 | 640 | 635 | 6 | 480 | 4.6 | 1.4 |
| IE 7 | ST 7 | 900 | 600 | 595 | 9 | 480 | 10.5 | 1.5 |
| IE 8 | ST 8 | 900 | 605 | 595 | 8 | 470 | 8.8 | 0.8 |
| IE 9 | ST 9 | 860 | 640 | 635 | 7 | 450 | 5.9 | 1.1 |
| IE 10 | ST10 | 870 | 600 | 595 | 8 | 480 | 7.7 | 0.3 |
| CE 1 | ST 11 | 880 | 640 | — | 0 | 470 | −2.4 | 2.4 |
| CE 2 | ST 12 | 880 | 640 | 635 | 10 | 470 | 19.0 | 9.0 |
| CE 3 | ST 13 | 880 | 640 | 635 | 10 | 470 | 12.3 | 2.3 |
| CE 4 | ST 14 | 880 | 640 | — | 0 | 470 | −3.2 | 3.2 |
| CE 5 | ST 15 | 880 | 640 | — | 0 | 470 | −7.7 | 7.7 |
| CE 6 | ST 16 | 880 | 640 | 635 | 10 | 470 | 27.1 | 17.1 |
| CE 7 | ST 17 | 880 | 640 | — | 0 | 470 | −6.0 | 6.0 |
| CE 8 | ST 18 | 880 | 640 | 635 | 10 | 470 | 13.8 | 3.8 |
| CE 9 | ST 19 | 1040 | 640 | 635 | 7 | 470 | 7.0 | 0.0 |
| CE 10 | ST 20 | 840 | 640 | 635 | 7 | 470 | 7.0 | 0.0 |
| CE 11 | ST 21 | 880 | 785 | 780 | 10 | 470 | 20.4 | 10.4 |
| CE 12 | ST 22 | 880 | 525 | 520 | 10 | 470 | 16.7 | 6.7 |
| CE 13 | ST 23 | 880 | 640 | — | 0 | 470 | 7.0 | 7.0 |
| CE 14 | ST 24 | 880 | 640 | 635 | 15 | 470 | 7.0 | 8.0 |
| CE 15 | ST 25 | 880 | 640 | 635 | 9 | 600 | 7.0 | 2.0 |
| CE 16 | ST 26 | 880 | 640 | 635 | 9 | 200 | 7.0 | 2.0 |
| CE 17 | ST 27 | 880 | 640 | 635 | 9 | 470 | 7.0 | 2.0 |
| CE 18 | ST 28 | 880 | 640 | 635 | 9 | 470 | 7.0 | 2.0 |
| CE 19 | ST 29 | 880 | 640 | 635 | 9 | 470 | 7.0 | 2.0 |
| CE 20 | ST 30 | 880 | 640 | 635 | 9 | 470 | 7.0 | 2.0 |

[Equation 2] $|T - T_R|$

TABLE 3

| Division | Heating temperature ($T_H$) (° C.) | Plating bath temperature ($T_F$) (° C.) | $El_{SPM}$ (%) | Equation 3 | Microstructure (area %) F | B | M + A + MA |
|---|---|---|---|---|---|---|---|
| IE 1 | 500 | 490 | 0.09 | 45 | 83 | 15 | 2 |
| IE 2 | 520 | 510 | 0.15 | 72 | 78 | 17 | 5 |
| IE 3 | 500 | 490 | 0.12 | 60 | 75 | 21 | 4 |
| IE 4 | 510 | 500 | 0.11 | 54 | 75 | 20 | 5 |
| IE 5 | 500 | 490 | 0.13 | 65 | 77 | 21 | 2 |
| IE 6 | 490 | 480 | 0.16 | 82 | 81 | 16 | 3 |
| IE 7 | 500 | 490 | 0.15 | 75 | 82 | 16 | 2 |
| IE 8 | 500 | 490 | 0.15 | 75 | 77 | 19 | 4 |
| IE 9 | 500 | 490 | 0.11 | 55 | 78 | 20 | 2 |
| IE 10 | 510 | 500 | 0.06 | 29 | 72 | 25 | 3 |
| CE 1 | 510 | 500 | 0.15 | 74 | 91 | 8 | 1 |
| CE 2 | 510 | 500 | 0.15 | 74 | 68 | 22 | 10 |
| CE 3 | 510 | 500 | 0.15 | 74 | 69 | 21 | 10 |
| CE 4 | 510 | 500 | 0.15 | 74 | 92 | 6 | 2 |
| CE 5 | 510 | 500 | 0.15 | 74 | 93 | 6 | 1 |
| CE 6 | 510 | 500 | 0.15 | 74 | 64 | 24 | 12 |
| CE 7 | 510 | 500 | 0.15 | 74 | 95 | 4 | 1 |
| CE 8 | 510 | 500 | 0.15 | 74 | 69 | 19 | 12 |
| CE 9 | 510 | 500 | 0.15 | 74 | 71 | 19 | 10 |
| CE 10 | 510 | 500 | 0.15 | 74 | 79 | 10 | 11 |
| CE 11 | 510 | 500 | 0.15 | 74 | 80 | 12 | 3 |
| CE 12 | 510 | 500 | 0.15 | 74 | 69 | 21 | 10 |
| CE 13 | 510 | 500 | 0.15 | 74 | 71 | 20 | 9 |
| CE 14 | 510 | 500 | 0.15 | 74 | 87 | 9 | 4 |
| CE 15 | 510 | 500 | 0.15 | 74 | 96 | 2 | 2 |
| CE 16 | 510 | 500 | 0.15 | 74 | 67 | 19 | 14 |
| CE 17 | 420 | 400 | 0.15 | 87 | 65 | 21 | 14 |
| CE 18 | 600 | 590 | 0.15 | 60 | 93 | 6 | 1 |
| CE 19 | 510 | 500 | 0.01 | 5 | 75 | 21 | 4 |
| CE 20 | 510 | 500 | 0.91 | 446 | 75 | 21 | 4 |

[Equation 3] $(1000 - TH) \times El_{SPM}$ $T_h$ is an average temperature of a charging temperature of a heating table of the hot-rolled steel sheet before being charged into a hot-dip plating bath and an extraction temperature of the same, $El_{SPM}$ is a difference in a length of the hot-rolled coated steel sheet before temper rolling and immediately after temper rolling.
F: Ferrite, B: Bainite, M: Martensite, A: Austenite, MA: Phase martensite

TABLE 4

| Division | Crystal orientation (area %) {110}<112> | {112}<111> | Equation 1 | YS (MPa) | TS (MPa) | YR | El (%) | HER(MPa) | BH |
|---|---|---|---|---|---|---|---|---|---|
| IE 1 | 5 | 6 | 11 | 657 | 782 | 0.84 | 15 | 59 | 40 |
| IE 2 | 7 | 6 | 13 | 674 | 793 | 0.85 | 13 | 65 | 50 |
| IE 3 | 10 | 6 | 16 | 703 | 790 | 0.89 | 14 | 52 | 62 |
| IE 4 | 9 | 8 | 17 | 696 | 782 | 0.89 | 14 | 55 | 61 |
| IE 5 | 7 | 7 | 14 | 706 | 802 | 0.88 | 14 | 57 | 54 |
| IE 6 | 6 | 8 | 14 | 687 | 799 | 0.86 | 15 | 55 | 44 |
| IE 7 | 6 | 5 | 11 | 705 | 810 | 0.87 | 15 | 60 | 57 |
| IE 8 | 6 | 7 | 13 | 676 | 805 | 0.84 | 15 | 57 | 59 |
| IE 9 | 8 | 5 | 13 | 729 | 819 | 0.89 | 14 | 49 | 54 |
| IE 10 | 9 | 10 | 19 | 774 | 850 | 0.91 | 13 | 48 | 61 |
| CE 1 | 5 | 3 | 8 | 473 | 520 | 0.91 | 13 | 88 | 21 |
| CE 2 | 4 | 4 | 8 | 574 | 809 | 0.71 | 9 | 40 | 22 |
| CE 3 | 4 | 3 | 7 | 554 | 770 | 0.72 | 9 | 55 | 19 |
| CE 4 | 3 | 3 | 6 | 664 | 730 | 0.91 | 16 | 53 | 12 |
| CE 5 | 3 | 5 | 8 | 653 | 710 | 0.92 | 17 | 60 | 15 |
| CE 6 | 3 | 4 | 7 | 600 | 870 | 0.69 | 10 | 41 | 18 |
| CE 7 | 2 | 2 | 4 | 644 | 700 | 0.92 | 18 | 45 | 9 |
| CE 8 | 1 | 3 | 4 | 650 | 890 | 0.73 | 10 | 39 | 7 |
| CE 9 | 7 | 7 | 14 | 503 | 752 | 0.67 | 13 | 31 | 45 |
| CE 10 | 7 | 6 | 13 | 698 | 812 | 0.86 | 8 | 49 | 34 |
| CE 11 | 3 | 2 | 5 | 671 | 818 | 0.82 | 9 | 55 | 19 |
| CE 12 | 4 | 3 | 7 | 748 | 880 | 0.85 | 9 | 51 | 25 |
| CE 13 | 3 | 3 | 6 | 689 | 840 | 0.82 | 10 | 43 | 18 |
| CE 14 | 3 | 2 | 5 | 654 | 808 | 0.81 | 15 | 46 | 11 |
| CE 15 | 2 | 2 | 4 | 692 | 778 | 0.89 | 15 | 49 | 16 |
| CE 16 | 7 | 7 | 14 | 632 | 890 | 0.71 | 7 | 40 | 49 |
| CE 17 | 7 | 6 | 13 | 616 | 893 | 0.69 | 7 | 39 | 37 |
| CE 18 | 2 | 0 | 2 | 703 | 772 | 0.91 | 15 | 45 | 2 |
| CE 19 | 3 | 1 | 4 | 643 | 794 | 0.81 | 15 | 43 | 12 |
| CE 20 | 16 | 15 | 31 | 856 | 911 | 0.94 | 7 | 36 | 83 |

[Equation 1] $FCO\{110\}<112> + FCO\{112\}<111>$
YS: Yield strength, TS: Tensile strength, YR: Yield rate, El: Elongation rate, HR: Stretch-flangeability, BH: Bake hardenability
*IE: Inventive Example CE: Comparative Example As can be seen from the above Tables 1 to 4, in the case of Inventive Examples 1 to 10 satisfying an alloy composition, a microstructure, manufacturing conditions, and Relational equations 1 to 3 proposed by the present disclosure, it can be seen that excellent mechanical properties are secured, such as bake hardenability (BH): 30 MPa or more, tensile strength (TS): 780 MPa or more, an elongation rate (El): 10% or more, a yield ratio (YR): 0.8 or more, and stretch-flangeability: 40% or more.

Comparative Examples 1 to 8 show cases in which the alloy composition proposed by the present disclosure is not satisfied, as a content of C, Si, Mn, and Cr, which greatly contributes to formation of ferrite and a low-temperature transformation structure, was deviated, a microstructure fraction or the following equation 1 proposed by the present disclosure was not satisfied. To this end, it can be seen that the present disclosure does not secure desired physical properties.

Comparative Examples 9 and 10 show cases in which the alloy composition proposed by the present disclosure is satisfied, but a finish rolling temperature does not satisfy the conditions of the present disclosure. In the case of Comparative Example 9, formability is deteriorated due to generation of excessive red scales, and in the case of Comparative Example 10, the temperature is controlled to lower than Ar3, it is not easy to secure stretch-flangeability due to formation of an elongated structure by rolling during ferrite transformation.

Comparative Examples 11 and 12 show cases in which the alloy composition proposed by the present disclosure is satisfied, but a first cooling stop temperature does not satisfy the conditions of the present disclosure, and it can be seen that it is difficult to secure the microstructure fraction proposed by the present disclosure, such that the mechanical properties to be obtained by the present disclosure are not secured. In particular, in the case of Comparative Example 11, as the first stop temperature exceeds 750° C. to form a 5% pearlite structure, it can be seen the mechanical properties to be obtained by the present disclosure are not secured.

Comparative Examples 13 and 14 show cases in which the alloy composition proposed by the present disclosure is satisfied, but an ultra-low cooling holding time does not satisfy the conditions of the present disclosure, and it can be seen that the mechanical properties to be obtained by the present disclosure are not be secured as the Relational equation 2 is not satisfied.

Comparative Examples 15 and 16 show cases in which the alloy composition proposed by the present disclosure is satisfied, but a secondary cooling stop temperature does not satisfy the conditions of the present disclosure, and it can be seen that it is difficult to secure the microstructure fraction proposed by the present disclosure, such that the mechanical properties to be obtained by the present disclosure are not secured.

Comparative Example 17 shows a case in which the alloy composition proposed by the present disclosure is satisfied, but a plating bath temperature does not satisfy the conditions of the present disclosure, and it can be seen that an elongation rate is at a low level.

Comparative Example 18 shows a case where the alloy composition proposed by the present disclosure is satisfied, but a heating temperature and a plating bath temperature do not satisfy the conditions of the present disclosure, and it can be seen that bake hardenability is at a low level.

Comparative Examples 19 and 20 show cases in which the alloy composition proposed by the present disclosure is satisfied, but $El_{SPM}$ does not satisfy the conditions of the present disclosure, and it can be seen that bake hardenability or elongation is at a low level.

FIG. 1 shows EBSD analysis results of Inventive Example 4 and Comparative Example 19, in FIG. 1, (a) shows the EBSD analysis results of Inventive Example 4, and (b) shows EBSD analysis results of Comparative Example 19. In the case of Inventive Example 4, a large amount of structures having the {110}<112> and {112}<111> crystal orientations proposed by the present disclosure were formed, whereas in Comparative Example 19, it can be seen that formation of a structure having a crystal orientation of the {110}<112> and {112}<111> is not sufficient.

Figure 2:
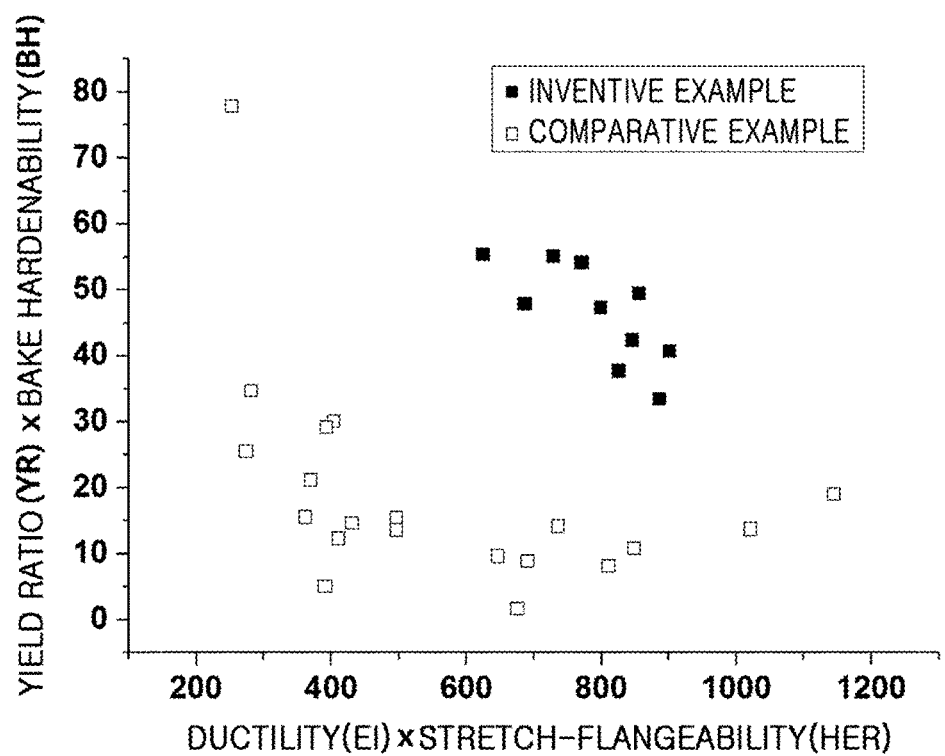
FIG. 2 is a graph showing values of a yield ratio (YR)× bake hardenability (BH) and ductility(El)×stretch-flangeability (HER) of Inventive Examples 1 to 10 and Comparative Examples 1 to 20.

FIG. 2 is a graph showing a value of a yield ratio (YR)×bake hardenability (BH) and elongation (El)×stretch-flangeability (HER) of Inventive Examples 1 to 10 and Comparative Examples 1 to 20. As can be seen from FIG. 2, in the Inventive Examples of the present disclosure, it can be seen that a yield ratio (YR), bake hardenability (BH), ductility (El), and elongation flangeability (HER) are all superior to the Comparative Examples.

The invention claimed is:

1. A hot-rolled coated steel sheet comprising: in wt %, C: 0.05-0.14%, Si: 0.1-1.0%, Mn: 1.0-2.0%, P: 0.001-0.05%, S: 0.001-0.01%, Al: 0.01-0.1%, Cr: 0.005-1.0%, Ti: 0.005-0.13%, Nb: 0.005-0.03%, N: 0.001-0.01%, and a balance of Fe and inevitable impurities,
wherein the hot-rolled coated steel sheet comprises a mixed structure of ferrite and bainite as a main phase, and as a remaining structure, one or more selected from a group consisting of martensite, austenite, and phase martensite (MA),
wherein a fraction of the ferrite and bainite is 95 to 99 area%, and Equation 1 is satisfied, $$FCO_{\{110\}<112>}+FCO_{\{112\}<111>}\geq 10 \quad \text{[Equation 1]}$$

where, $FCO_{\{110\}<112>}$ and $FCO_{\{112\}<111>}$, each represents an area fraction occupied by a structure having ac crystal orientation of {110}<112> and {112}<111>.

2. The hot-rolled coated steel sheet of claim 1, wherein a fraction of bainite is 3 to 30 area%.

3. The hot-rolled coated steel sheet of claim 1, wherein the hot-rolled coated steel sheet has bake hardenability (BH): 30 MPa or more, tensile strength (TS): 780 MPa or more, an elongation rate (El): 10% or more, a yield ratio (YR): 0.8 or more, and stretch-flangeability: 40% or more.

4. The hot-rolled coated steel sheet of claim 1, wherein in the hot-rolled coated steel sheet, a plating layer including one or more of zinc or aluminum is formed on one side or both sides of a base steel sheet.

* * * * *